United States Patent
Zhang et al.

(10) Patent No.: US 7,992,769 B2
(45) Date of Patent: Aug. 9, 2011

(54) POSITIONING MECHANISM AND KEYPAD USING THE SAME

(75) Inventors: Xu-Ri Zhang, Shenzhen (CN); Zheng-Fang Wen, Shenzhen (CN); Ye Liu, Shenzhen (CN); Rui-Hao Chen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 637 days.

(21) Appl. No.: 11/964,861

(22) Filed: Dec. 27, 2007

(65) Prior Publication Data

US 2009/0101704 A1    Apr. 23, 2009

(30) Foreign Application Priority Data

Oct. 19, 2007    (CN) .......................... 2007 1 0202142

(51) Int. Cl.
*G05D 25/00*    (2006.01)

(52) U.S. Cl. ..................... 235/146; 235/275; 235/462.44
(58) Field of Classification Search .................. 235/375, 235/380, 483, 484, 485, 486, 146, 462.44, 235/462.45, 472.01, 472.02, 472.03
See application file for complete search history.

(56) References Cited

U.S. PATENT DOCUMENTS 3,768,064 A * 10/1973 Pabich .......................... 439/370
6,219,230 B1 * 4/2001 Cho .......................... 361/679.55

* cited by examiner

*Primary Examiner* — Karl D. Frech
(74) *Attorney, Agent, or Firm* — Jeffrey T. Knapp (57) ABSTRACT

A positioning mechanism (100) configured for positioning a keypad (20) on a portable electronic device includes a plurality of retainers (10). Each retainer includes a main portion (11) and a fixing unit (12) formed on the main portion. The main portion includes an engaging surface (112) and an opposite latching surface (114). A protrusion (1121) is formed on the engaging surface, a first positioning surface (1122) corresponding to a first portable electronic device (30) is formed on the protrusion. The retainer is mounted to the keypad via the fixing unit.

8 Claims, 8 Drawing Sheets

POSITIONING MECHANISM AND KEYPAD USING THE SAME

BACKGROUND OF THE INVENTION

1. Field of the Invention

The present invention generally relates to a positioning mechanism and a keypad using the positioning mechanism.

2. Description of related art

Nowadays, many portable electronic devices, such as mobile phones and personal digital assistants (PDAs), can be used to play games. Since typical keypads of the portable electronic devices are usually too small for playing games, external keypads having keys arranged similarly to that of keypads of computers are often used with portable electronic devices. An external keypad can be electronically connected to a portable electronic device via USB (universal serial bus) or Bluetooth, etc.

In use, an external keypad must be stationary to be operated more easily. If the external keypad is not stationary, when in use, it may become disconnected or disengaged from the portable electronic device.

Therefore, a new positioning mechanism and a new keypad are desired in order to overcome the above-described shortcomings.

SUMMARY

A positioning mechanism configured for positioning a keypad on a portable electronic device includes a plurality of retainers. Each retainer includes a main portion and a fixing unit formed on the main portion. The main portion includes an engaging surface and an opposite latching surface. A protrusion is formed on the engaging surface, a first positioning surface corresponding to a first portable electronic device is formed on the protrusion. The retainer is mounted to the keypad via the fixing unit.

Other novel features will become more apparent from the following detailed description when taken in conjunction with the accompanying drawings.

BRIEF DESCRIPTION OF THE DRAWINGS

Many aspects of the positioning mechanism and keypad can be better understood with reference to the following drawings. The components in the drawings are not necessarily drawn to scale, the emphasis instead being placed upon clearly illustrating the principles of the positioning mechanism and keypad. Moreover, in the drawings, like reference numerals designate corresponding parts throughout the several views.

DETAILED DESCRIPTION OF THE INVENTION

Figure 1A:
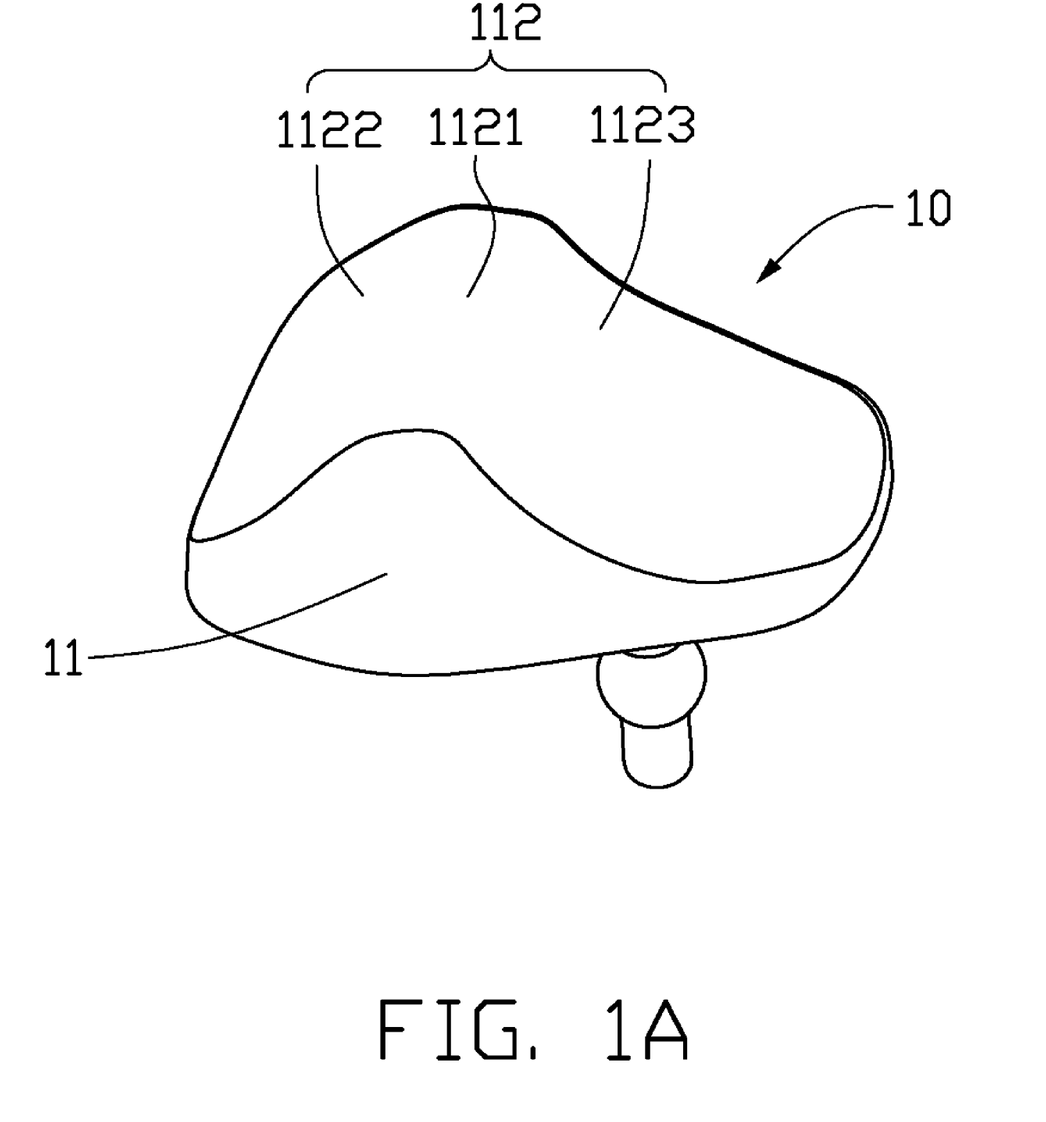
FIG. 1A is a schematic view of a fixing unit of a positioning mechanism in accordance with a present embodiment.
Figure 1B:
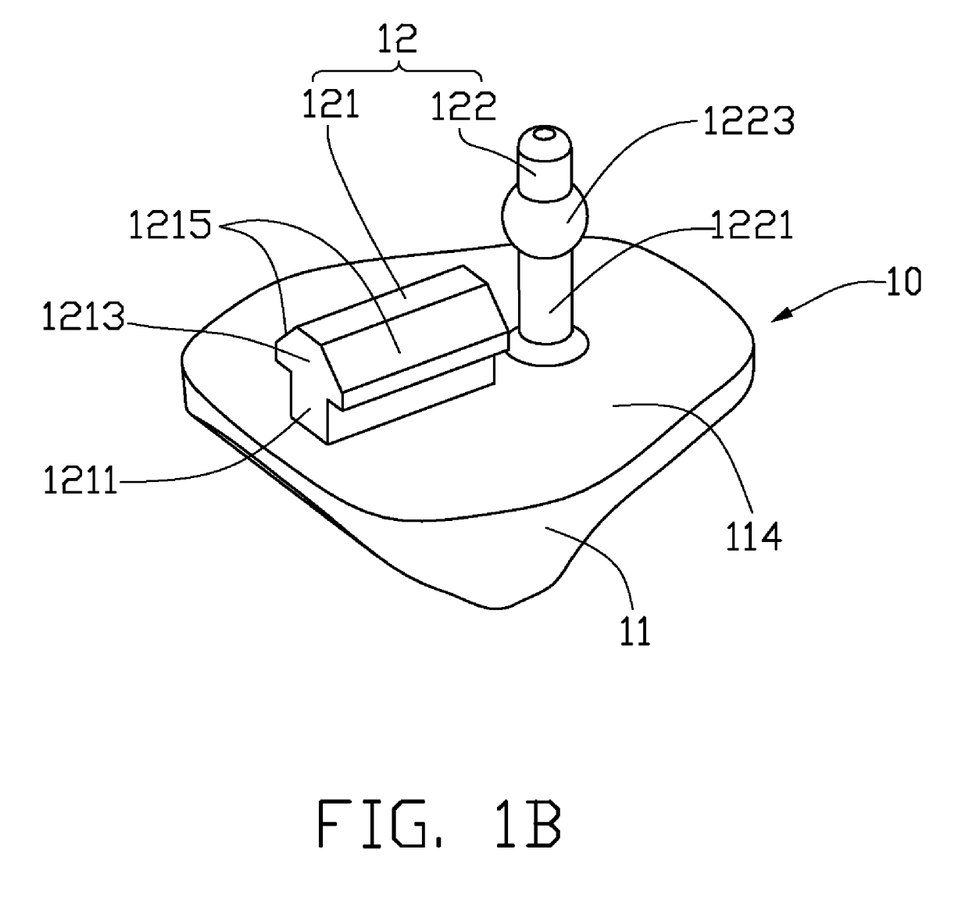
FIG. 1B is similar to FIG. 1A, but shown in another visual angle.
Figure 2:
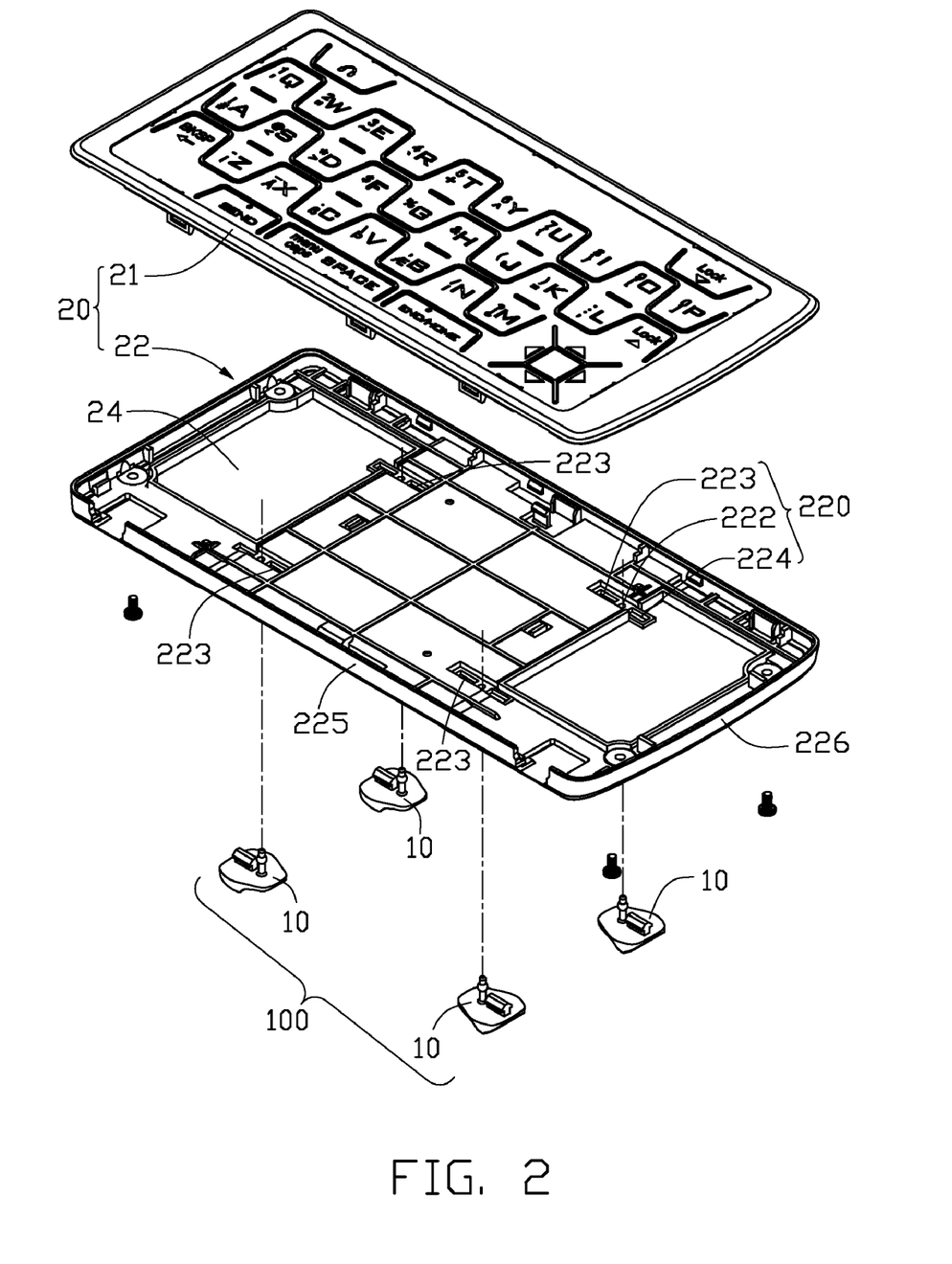
FIG. 2 is a disassembled view of a keypad in accordance with a present embodiment with the positioning mechanism shown in FIG. 1.

Referring to FIG. 2, a positioning mechanism 100 in accordance with a present embodiment and a keypad 20 employing the same are provided. The positioning mechanism 100 is used to position the keypad 20 on portable electronic devices. The positioning mechanism 100 includes four retainers 10 made of elastic material, such as rubber. Also referring to FIG. 1A and FIG. 1B, each retainer 10 includes a main portion 11 and a fixing unit 12 formed on the main portion 11. The main portion 11 includes an engaging surface 112 and an opposite latching surface 114. A protrusion 1121 is formed on the engaging surface 112. A first positioning surface 1122 and a second positioning surface 1123 are respectively formed on two opposite sides of the protrusion 1121. The first positioning surface 1122 and the second positioning surface 1123 are respectively configured corresponding to shapes of two types portable electronic devices, such as two types portable electronic devices having different width.

The fixing unit 12 is formed on the latching surface 114, and includes an approximately T-shaped latching member 121 and a positioning pin 122. The latching member 121 includes a connecting component 1211 formed on the latching surface 114 and a latching component 1213. The connecting component 1211 and the latching component 1213 are both prisms, and one side of the latching component 1213 is connected to one side of the connecting component 1211. Two wedge-shaped ribs 1215 configured for mount the retainer on a keypad are respectively formed on both sides of the latching component 1213, thus the latching member 121 is configured to be T-shaped. The positioning pin 122 includes a cylindrical component 1221 formed on the engaging surface 112 and a sphere component 1223 formed on an end of the cylindrical component 1221. A diameter of the sphere component 1223 is larger than that of the cylindrical component 1221. A distance between the sphere component 1223 and the latching surface 114 is larger than a height of the latching member 121.

Figure 3:
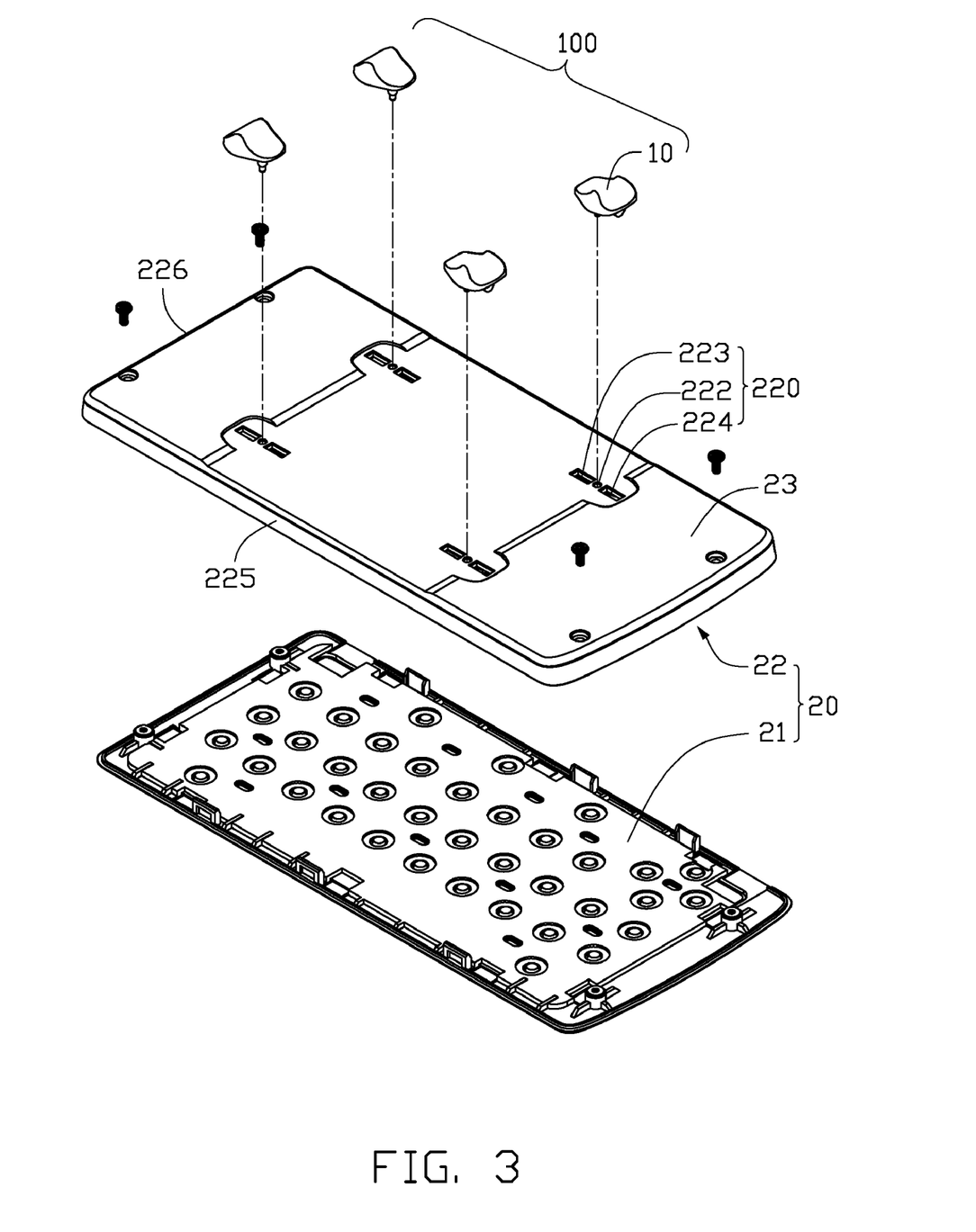
FIG. 3 is similar to FIG. 2, but shown in another visual angle.

Also referring to FIG. 2 and FIG. 3, a keypad 20 interconnect with the positioning mechanism 100 in accordance with a present embodiment is provided. The keypad 20 includes a rectangular upper housing 21 and a rectangular lower housing 22. The lower housing 22 includes an outer surface 23 and an inner surface 24 on the opposite side of the outer surface 23. Each side of the lower housing 22 bends towards the inner surface 24, thus two parallel first frames 225 and two parallel second frames 226 perpendicular to the first frames 225 are formed on the lower housing 22. A length of the first frame 225 is larger than that of the second frame 226.

The lower housing 22 defines four receiving members 220 corresponding to the four retainers 10 therein. The four receiving members 220 are arranged in two rows parallel to the second frames 226, and a distance between the two rows corresponds to a width of a portable electronic device. Each receiving member 220 includes a round latching hole 222 and two rectangular latching apertures 223, 224 that are respectively arranged at two opposite sides of the latching hole 222 and parallel to the first frames 225. A diameter of the latching hole 222 is substantially equal to a diameter of the cylindrical component 1221 of the positioning pin 122. A height of the connecting component 1211 corresponds with a depth of the latching apertures 223, 224.

Figure 4:
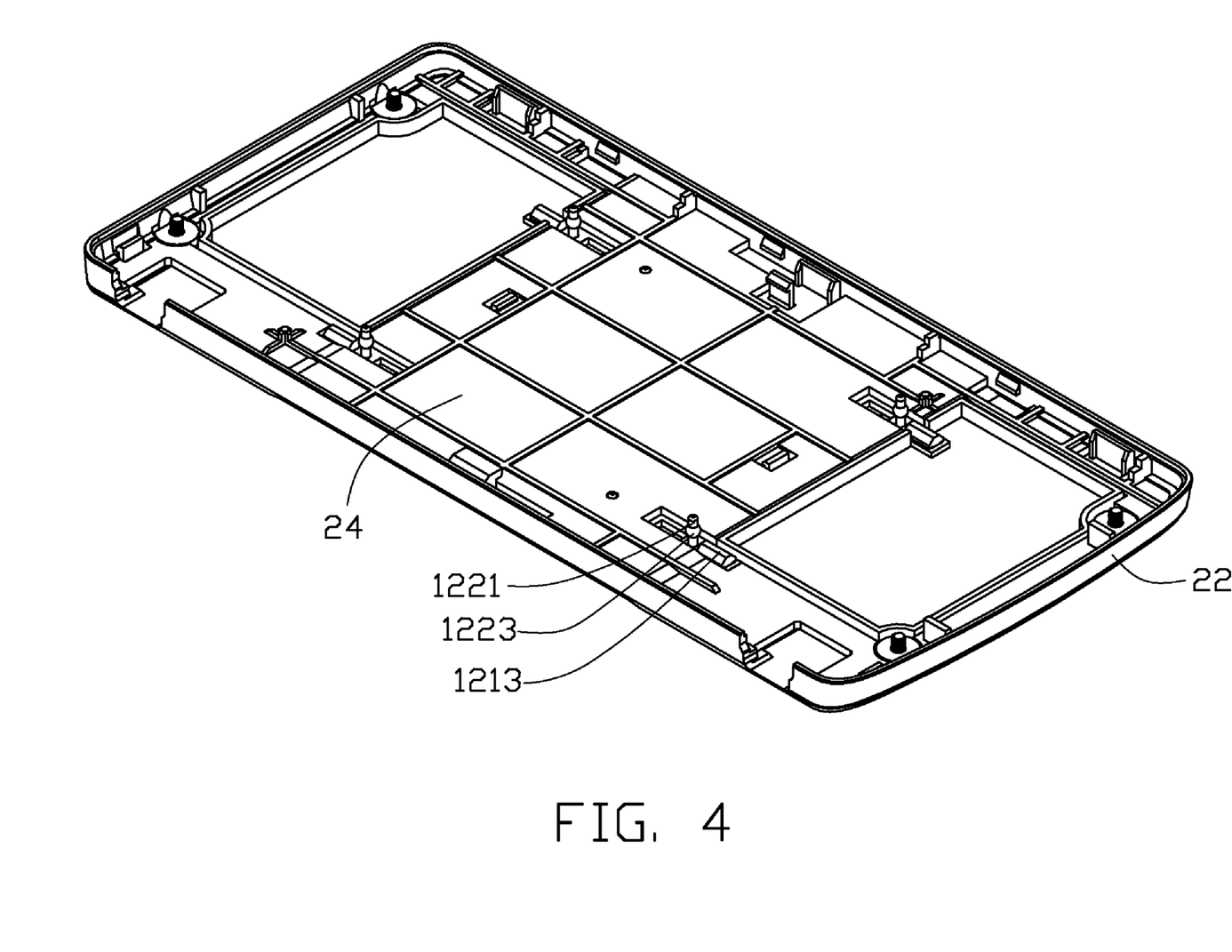
FIG. 4 is an assembled view of the positioning mechanism shown in FIG. 1 and a lower housing of the keypad shown in FIG. 2.

Also referring to FIG. 4, the positioning mechanism 100 is assembled to the lower housing 22 of the keypad 20. Since the retainers 10 are made of elastic materials, each sphere component 1223 is compressed and inserted into a latching hole 222, thus resiles to hold the positioning pin 122 in the latching hole 222. Similarly, each latching component 1213 is transformed and inserted into a latching aperture 223/224, thus resiles to block the latching member 121 in the latching aperture 223/224. In this way, each retainer 10 is positioned to the keypad 20 via latching member 121 and positioning pin 122. Finally, the upper housing 21 is assembled with the lower housing 22, thus the keypad 20 is completed.

Figure 5:
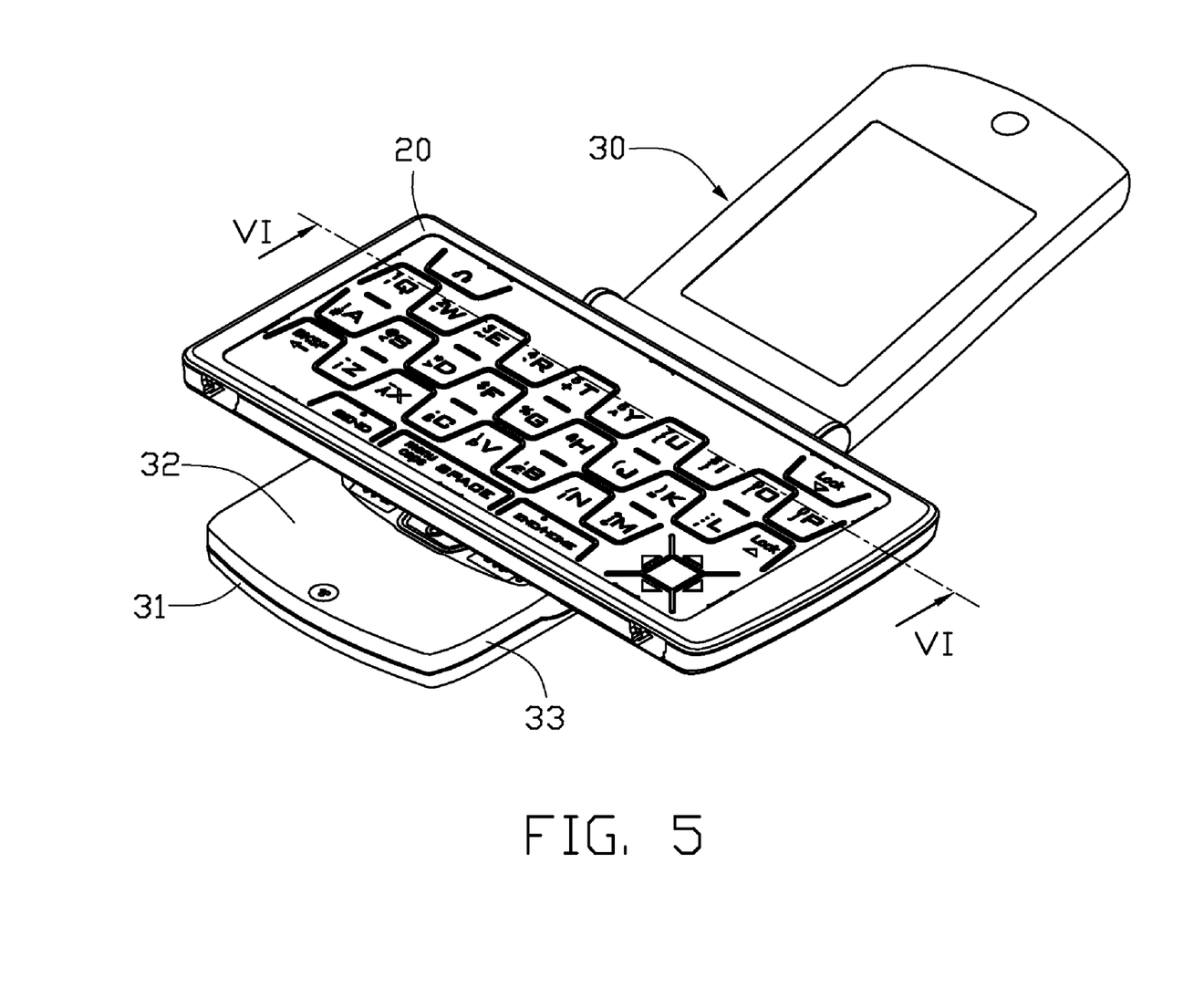
FIG. 5 is a schematic view of positioning the keypad shown in FIG. 2 to a portable electronic device via the positioning mechanism shown in FIG. 1.
Figure 6:
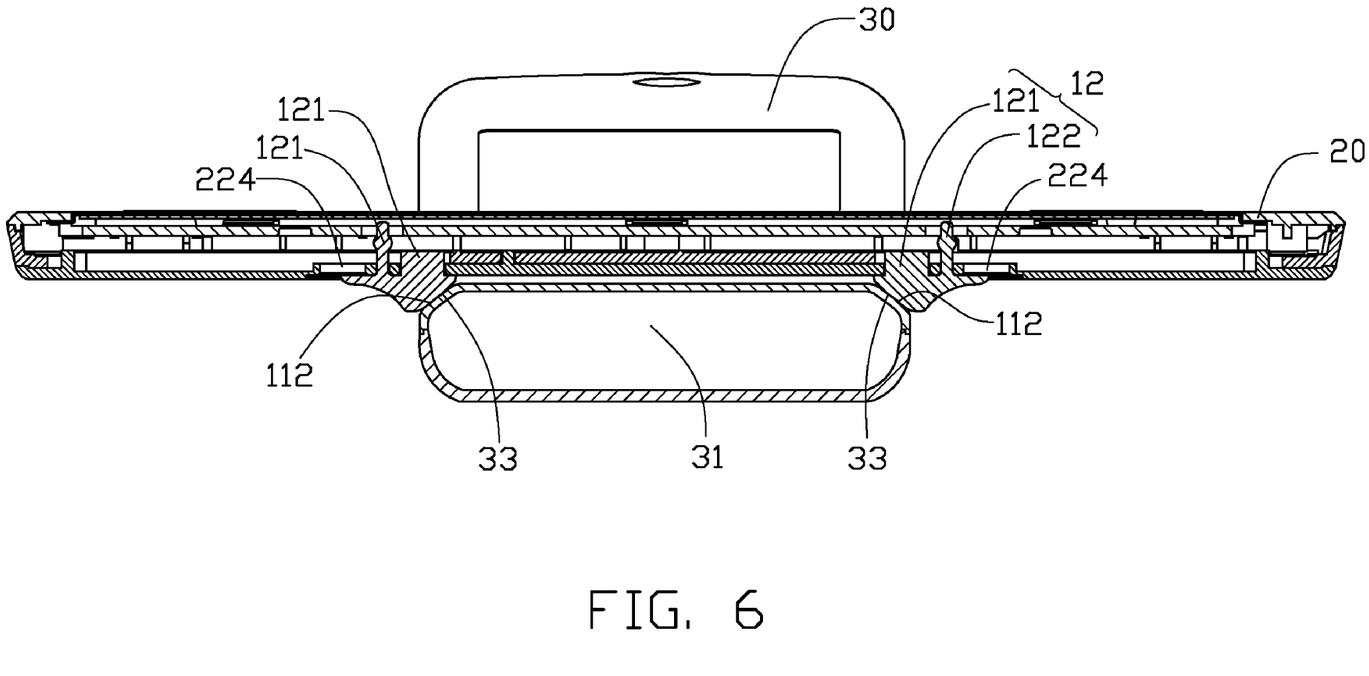
FIG. 6 is a cross-sectional view along the line VI-VI of FIG. 5.

Also referring to FIG. 5 and FIG. 6, the keypad 20 is assembled to a portable electronic device 30 via the retainers 10. The portable electronic device 30 can be a mobile phone, a personal digital assistant (PDA), etc. The portable electronic device 30 includes a main body 31, a mounting surface 32 and a mounting side 33 corresponding to the first positioning surface 1121 of each retainer 10. In this way, the keypad 20 can be stably positioned on the mounting surface 32 of the portable electronic device 30, with the first positioning surface 1121 engaging with the mounting side 33 of the portable electronic device 30.

Figure 7:
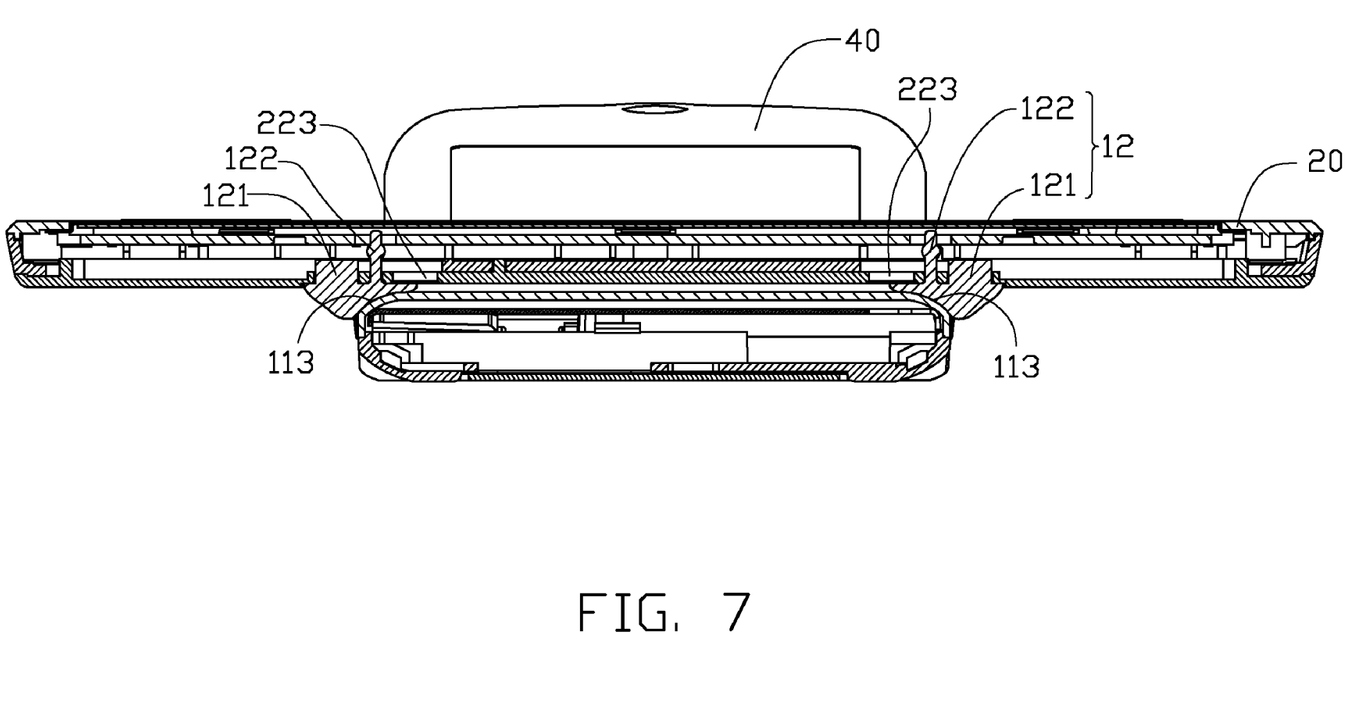
FIG. 7 is a schematic view of positioning the keypad shown in FIG. 2 to another portable electronic device via the positioning mechanism shown in FIG. 1.

Also referring to FIG. 7, the keypad 20 is assembled to another portable electronic device 40 via the retainers 10. The portable electronic device 40 has a shape corresponding to the second positioning surface 1123 of each retainer 10. In assembly, the latching member 121 of each retainer 10 is compressed and pulled out from its corresponding latching aperture 223/224. The retainer 10 is rotated around the positioning pin 10 inserted in the latching hole 222, and then the latching component 1213 is inserted into the adjacent latching aperture 224/223 defined in another side of the latching hole 222 and blocked in the latching aperture 223/224. Since a diameter of the sphere component 1223 is larger than that of the cylindrical component 1221 and a distance between the sphere component 1223 and the latching surface 114 is larger than a length of the latching member 121, the retainer 10 can be rotated around its positioning pin 122 without being detached from the lower housing 22. In this way, the keypad 20 can be stably positioned on the portable electronic device 40, with the second positioning surface 1123 engaging with the shape the portable electronic device 40.

Understandably, in use, each retainer 10 can also be detached from the keypad 20 and mounted to the keypad 20 again, thus, the positioning pin 121 of each the fixing unit 12 and the latching hole 222 of each receiving member 220 can be omitted. The number of the retainers 10 and their corresponding receiving members 220 can be changed to other numbers, for examples, two or six. The positioning mechanism 100 can also be used to position other accessories such as displays on portable electronic devices, or be used to fix portable electronic devices to pedestals.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A positioning mechanism configured for positioning a keypad on a portable electronic device, comprising:
a plurality of retainers made of elastic material, each retainer including a main portion and a fixing unit formed on the main portion; the main portion including an engaging surface and an opposite latching surface, a protrusion being formed on the engaging surface, a first positioning surface corresponding to a first portable electronic device being formed on the protrusion; the retainer being mounted to the keypad via the fixing unit; wherein each fixing unit includes a T-shaped latching member and a positioning pin, the latching member including a connecting component formed on the latching surface and a latching component connected to the connecting component, the positioning pin including a cylindrical component formed on the latching surface and a sphere component connected to an end of the cylindrical component, a diameter of the sphere component being larger than that of the cylindrical component, and a distance between the sphere component and the latching surface being larger than a length of the latching member.

2. The positioning mechanism as claimed in claim 1, wherein a second positioning surface corresponding to a second portable electronic device and opposite to the first positioning surface is formed on the protrusion.

3. The positioning mechanism as claimed in claim 2, wherein the retainers are rotatably mounted on the keypad.

4. A keypad, comprising:
an upper housing;
a lower housing assembled with the upper housing and defining a plurality of receiving members therein; and
a positioning mechanism including a plurality of retainers corresponding to the receiving members, each retainer including a main portion and a fixing unit formed on the main portion; the main portion including an engaging surface and an opposite latching surface, a protrusion formed on the engaging surface, a first positioning surface and a second positioning surface respectively formed on two opposite sides of the protrusion; the first positioning surface configured for engaging with a first portable electronic device, and the second positioning surface configured for engaging with a second portable electronic device; the retainer being mounted to the keypad via the fixing unit and the receiving members;
wherein each receiving member includes a latching hole and at least one latching aperture defined adjacent to the latching hole; each fixing unit includes a T-shaped latching member and a positioning pin, the latching member including a connecting component formed on the latching surface and a latching component connected to the connecting component, the positioning pin including a cylindrical component formed on the latching surface and a sphere component connected to an end of the cylindrical component, a diameter of the sphere component being larger than that of the cylindrical component, and a distance between the sphere component and the latching surface being larger than a length of the latching member.

5. The keypad as claimed in claim 4, wherein the positioning pin is inserted in the latching hole and the latching member is inserted in the latching aperture to mount the retainer on the lower housing.

6. A keypad used in portable electronic devices, comprising:
an upper housing;
a lower housing assembled with the upper housing; and
a positioning mechanism including a plurality of retainers; each retainer including a main portion and a fixing unit formed on the main portion, the main portion including an engaging surface and a protrusion formed on the engaging surface, a first positioning surface and a second positioning surface formed on the protrusion; wherein the retainers are rotatably mounted on the lower housing via the fixing units, the first positioning surfaces of the retainers engages with a first portable electronic device to assemble the keypad on the first portable electronic device when the retainers are rotated to a first status, and the second positioning surfaces of the retainers engages with a second portable electronic device to assemble the keypad on the second portable electronic device when the retainers are rotated to a second status;

wherein the lower housing defines a plurality of receiving members corresponding to the retainers therein, each receiving member includes a latching hole, a first latching aperture, and a second latching aperture; the first latching aperture and the second latching apertures positioned adjacent to the latching hole;

wherein the main portion of each retainer further includes a latching surface opposite to the engaging surface thereof, the fixing unit of the retainer formed on the latching surface;

wherein each fixing unit includes a latching member and a positioning pin; the positioning pins rotatably received in the latching holes to rotatably mount the retainers on the lower housing; the latching members received in the first latching apertures to mount the retainer on the lower housing in the first status, and received in the second latching apertures to mount the retainer on the lower housing in the second status; and wherein the positioning pin includes a cylindrical component formed on the latching surface and a sphere component connected to an end of the cylindrical component, the sphere component having a diameter being larger than that of the cylindrical component for holding the positioning pin in corresponding latching hole.

7. The keypad as claimed in claim 6, wherein the latching member includes a connecting component formed on the latching surface and a latching component connected to the connecting component, the latching component having two ribs respectively formed on both sides thereof for holding the latching component in its corresponding first latching aperture or second latching aperture.

8. The keypad as claimed in claim 6, wherein the retainers are made of elastic material.

\* \* \* \* \*